United States Patent
Hawthorne et al.

(10) Patent No.: US 7,152,040 B1
(45) Date of Patent: Dec. 19, 2006

(54) ELECTRONIC SHELF LABEL

(75) Inventors: Eric Scott Hawthorne, Woodinville, WA (US); Timothy Belvin, Auburn, WA (US)

(73) Assignee: Microsoft Corporation, Redmond, WA (US)

( * ) Notice: Subject to any disclaimer, the term of this patent is extended or adjusted under 35 U.S.C. 154(b) by 420 days.

(21) Appl. No.: 10/445,516

(22) Filed: May 27, 2003

(51) Int. Cl.
G06Q 20/00 (2006.01)
(52) U.S. Cl. .................. 705/16; 705/20; 705/14; 340/522; 340/531; 235/380; 235/383
(58) Field of Classification Search .................. 705/20
See application file for complete search history.

(56) References Cited

U.S. PATENT DOCUMENTS

| | | | |
|---|---|---|---|
| 5,151,684 A * | 9/1992 | Johnsen .................. 340/568.1 |
| 5,250,789 A * | 10/1993 | Johnsen .................. 705/14 |
| 5,448,226 A * | 9/1995 | Failing et al. ............. 340/5.91 |
| 5,490,107 A * | 2/1996 | Akaogi et al. .......... 365/185.22 |
| 5,548,282 A | 8/1996 | Escritt et al. ........... 340/825.35 |
| 5,587,703 A | 12/1996 | Dumont .................... 340/572 |
| 5,703,468 A | 12/1997 | Petrillo ..................... 320/39 |
| 5,736,967 A * | 4/1998 | Kayser et al. .............. 345/2.1 |
| 5,797,132 A * | 8/1998 | Altwasser ................. 705/16 |
| 5,841,365 A * | 11/1998 | Rimkus ................... 340/5.61 |
| 6,082,620 A | 7/2000 | Bone, Jr. ............... 235/462.16 |
| 6,269,342 B1 * | 7/2001 | Brick et al. ................ 705/20 |
| 6,307,919 B1 | 10/2001 | Yoked ...................... 378/492 |
| 6,404,339 B1 | 6/2002 | Eberhardt .............. 340/572.01 |
| 6,512,919 B1 * | 1/2003 | Ogasawara ............. 455/422.1 |
| 6,542,873 B1 | 4/2003 | Goodwin, III et al. ....... 705/20 |
| 6,584,449 B1 * | 6/2003 | Otto ............................ 705/20 |
| 6,601,764 B1 * | 8/2003 | Goodwin, III ............. 235/385 |
| 6,624,757 B1 | 9/2003 | Johnson ................ 340/825.52 |
| 6,669,092 B1 | 12/2003 | Leanheart et al. ...... 235/462.13 |
| 6,703,934 B1 | 3/2004 | Nijman et al. ........... 340/572.1 |
| 6,715,676 B1 * | 4/2004 | Janning ...................... 235/383 |
| 6,724,403 B1 | 4/2004 | Santoro et al. ............. 345/765 |
| 6,774,794 B1 | 8/2004 | Zimmerman et al. ..... 340/572.8 |
| 6,798,389 B1 * | 9/2004 | Eberhardt, Jr. ............... 345/3.1 |
| 6,844,821 B1 | 1/2005 | Swartzel et al. .......... 340/691.6 |
| 6,924,781 B1 * | 8/2005 | Gelbman ..................... 345/85 |
| 2004/0035927 A1 * | 2/2004 | Neumark .................... 235/385 |

FOREIGN PATENT DOCUMENTS

EP 1176532 A1 * 1/2002

OTHER PUBLICATIONS

"Wireless Technology Reshapes Retailers", by A. Bednarz, *Network World*, Aug. 12, 2002, 6 pages.
"RFID Tag Reader Uses FSK to Avoid Collisions", by Y. Lee, *Electronic Design*, Oct. 28, 1999, pp. 103-104.
"The Vision Thing", Reprinted from Grocery headquarters, May 2002, 1 page.

(Continued)

*Primary Examiner*—Lynda Jasmin
(74) *Attorney, Agent, or Firm*—John D. Veldhuis-Kroeze; Westman, Champlin & Kelly, P.A.

(57) ABSTRACT

An electronic shelf label includes a transceiver configured to communicate with a plurality of wireless data tags associated with a plurality of retail products. The transceiver is further configured to communicate with a retail server system. A display displays information related to the plurality of retail products. A controller sends data to the retail server system related to the plurality of wireless data tags.

40 Claims, 9 Drawing Sheets

OTHER PUBLICATIONS

"Pricing Done Right", www.grogerheadquarters.com, May 2002, 3 pages.
RFID Journal, Frequently Asked Questions, 2003, 5 pages.
"R&D Makes Electronic Price Tag a Real Bargain", *Lucent Technologies*, 3 pages, Jan. 1997.
"Retailers Reap the Rewards of Source Tagging", *Source Tagging*, 1 page, 2000-2001.
"Checkpoint Source Tagging Maximizes Security Solutions", *Source Tagging*, 1 page, 2000-2001.
"Our mission", *Source Tagging*, 1 page, 2000-2001.

* cited by examiner

ELECTRONIC SHELF LABEL

BACKGROUND OF THE INVENTION

The present invention relates to labels used to provide price and other information in retail stores. More specifically, the present invention relates to electronic labels for attaching to consumer goods in retail stores.

Price labels or tags are frequently attached to consumer goods in retail stores to price information and other information to consumers. Such tags are typically provided for the convenience of the consumer. The price labels are often also used by a cashier during checkout in order to charge the customer for the goods. However, due to the introduction of bar codes, UPC and SKU codes, price tags are typically no longer needed by the cashier. Instead, the bar code can be read by a bar code reader or other information related to the product can be entered into a computerized point of sale (POS) device which totals the purchase. Further, RFID tags are being used to identify products. The RFID tag is energized when it is placed in the proximity of an RFID tag reader. This causes circuitry within the RFID tag to transmit digital data which is stored in a memory. The data can be used to identify the goods associated with the RFID tag.

Even though price tags are no longer required by the cashier, they continue to be used to provide price information to customers. In some instances, pricing information can be placed on the shelves or racks which carry goods. However, if the goods are separated from their display rack, a consumer will not be able to determine the price of the goods. Further, some goods may require individual pricing such as certain clothing items, or other products which are not suited for placement on racks or shelves.

One problem with price labels is that if the price is changed or for some other reason it is desired to modify the label, the label must be physically altered. This is a time consuming process and may lead to additional errors in labeling. Further, it is difficult to maintain accurate inventory information with such labels.

There is an ongoing effort to introduce transmitters, such as RFID tags, into consumer goods. The introduction of such transmitters can be used to replace or augment other codes or information carried on consumer goods such as UPC or SKU codes. Such codes can be used to automate the checkout process. Such automation increases the speed and the accuracy of the checkout process. Further, the transmitters can be used to assist in automating the inventory process. The use of RFID tags on consumer goods is described in the article entitled "Wireless Technology Reshapes Retailers", by A. Bednarz *Network World*, Aug. 12, 2002.

SUMMARY OF THE INVENTION

An electronic shelf label includes a transceiver configured to communicate with a plurality of wireless data tags associated with a plurality of retail products carried on a retail product support structure. The transceiver is further configured to communicate with a retail server system. A display in the electronic shelf label displays information related to the plurality of retail products. A controller is configured to send data to the retail server system through the transceiver as a function of data received from at least one of the plurality of wireless data tags. The controller is further configured to control the displayed of information on the display.

DETAILED DESCRIPTION OF ILLUSTRATIVE EMBODIMENTS

The present invention is directed to the automation of retail locations. The present invention includes an electronic shelf label configured to be mounted on a shelf or other support structure which carries consumer retail goods. As used herein "shelf" includes any type of retail support structure such as shelves, racks, display cases or units, kiosks, floors, floor stands, containers or carriers such as shopping carts, or any other configuration or support structure which is used to contain or display retail consumer goods in a retail location. The electronic shelf label includes a display which is configured to display information related to retail goods carried on the shelf. A first transceiver is configured to allow the electronic shelf label to communicate with a retail server system. A second transceiver is configured to allow the electronic shelf label to communicate with wireless data tags (electronic price tags) associated with a plurality of retail products carried on the shelf. In one embodiment, the first and second transceivers are implemented in a single transceiver which is used to perform both functions. Further, in some embodiments the transceiver is only capable of unidirectional communications. The electronic shelf label can transmit information to the retail server system based upon data received from the wireless data tags of the plurality of retail products. One example of wireless data tag includes an electronic price tag configured to be attached to consumer goods and which includes an optional electronic display. Remote communication techniques, such as those which use radio frequency (RF) signals, can be used to communicate with the electronic price tag or electronic shelf label and update the display or other information in the electronic price tag or electronic shelf label.

Figure 1:
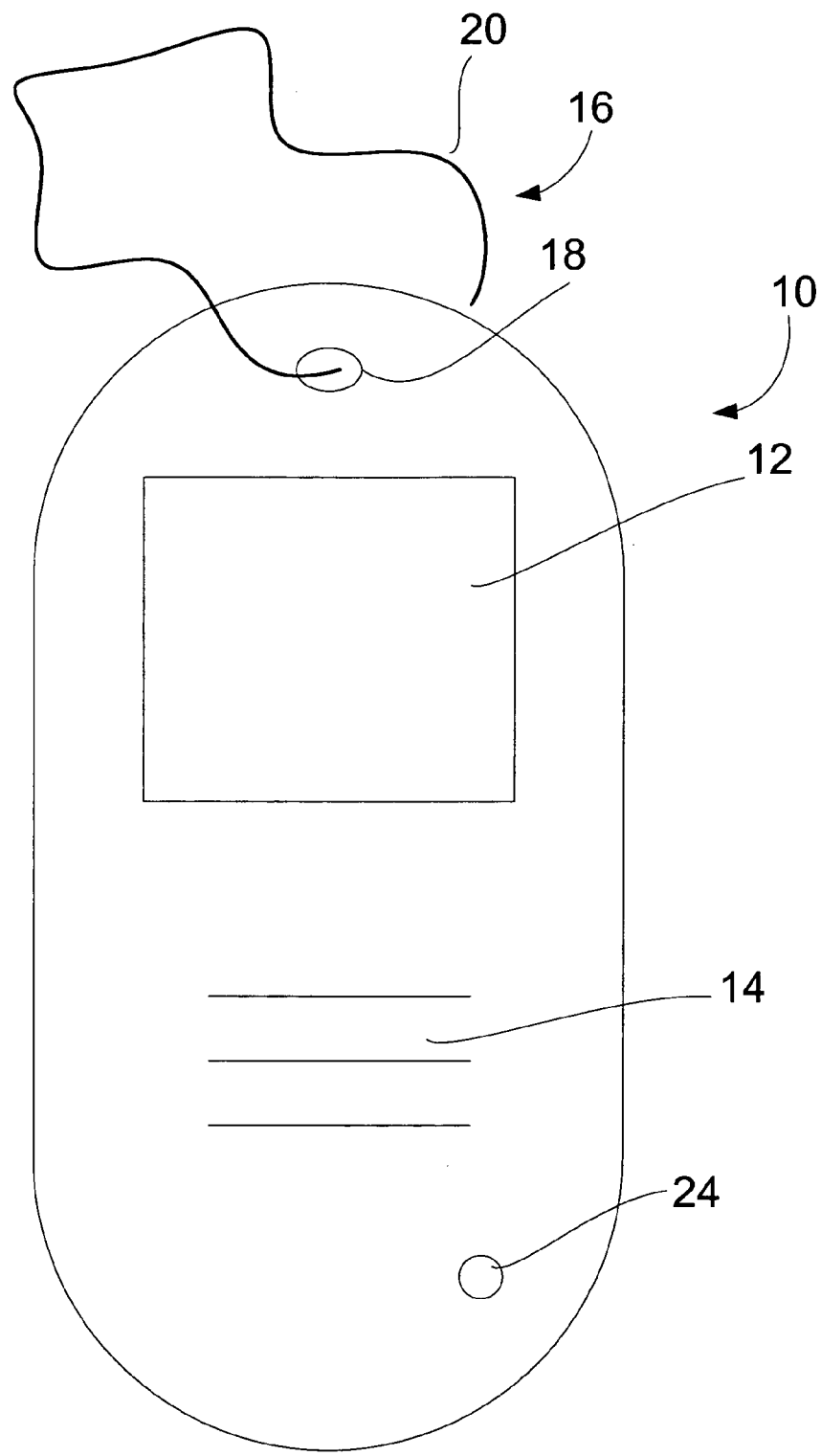
FIG. 1 is a front plan view of an electronic price tag including a display in which the tag is configured to hang from a product.

FIG. 1 is a front plan view of an electronic price tag (wireless data tag) 10 which includes an electronic display 12 for displaying information in accordance with the present invention. Price tag 10 as shown in just one example configuration in the present invention is not limited to this configuration. In the example of FIG. 1, price tag 10 also includes a printable area 14 for displaying static information. An attachment mechanism 16 is provided. In the example of FIG. 1, the attachment mechanism is shown as a hole 18 through tag 10 and a lanyard 20 which can be used to attach the price tag 10 to consumer goods such as clothing, electrical and mechanical items, food, and other items.

Figure 2:
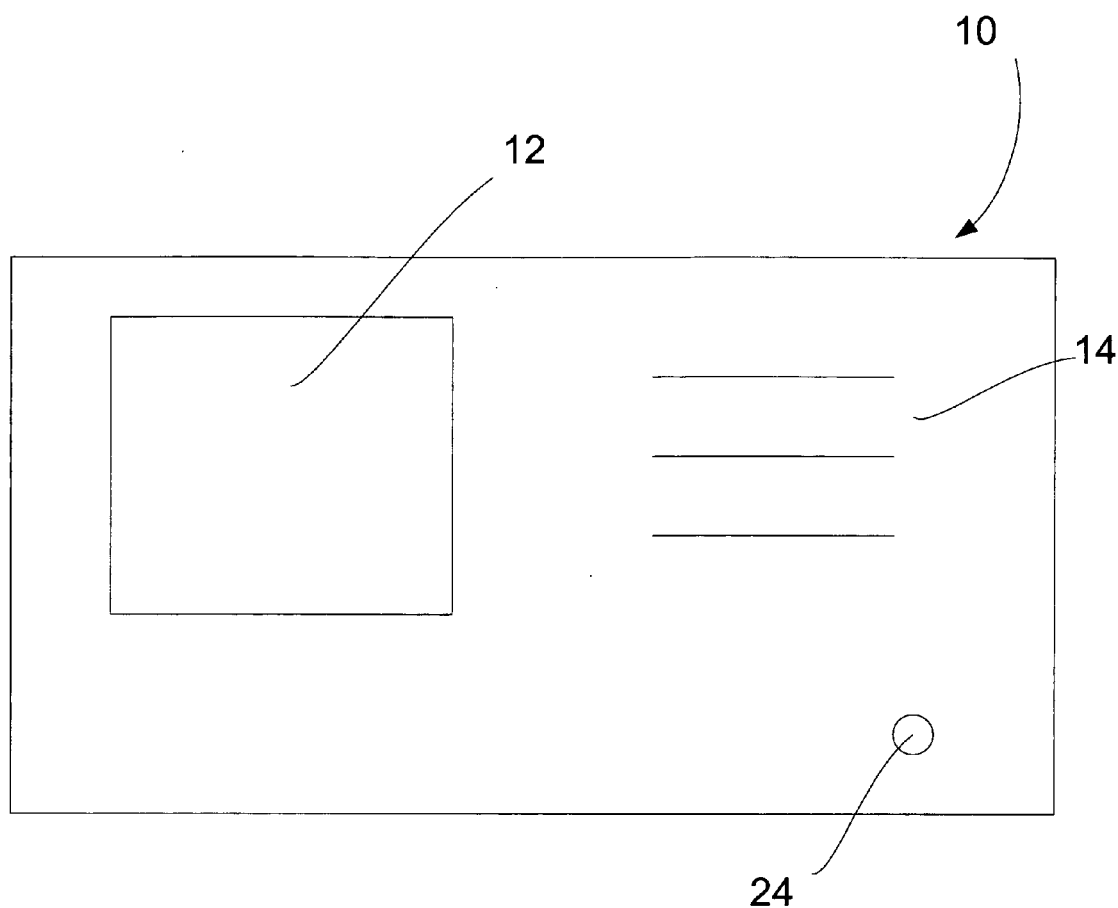
FIG. 2 is a front plan view of an electronic price tag configured to be attached directly to a product.

FIG. 2 is another example embodiment of an electronic price tag 10 shown in plan view. In the embodiment of FIG. 2, an attachment mechanism such as an adhesive may be employed. Other example attachment mechanisms include clamps, punches, and any other appropriate technique used to attach a price tag or an anti-theft device to consumer goods.

The particular price tag configuration shown in FIGS. 1 and 2 are for example purposes only. The present invention is not limited to these particular configurations and any configuration can be used which provides an area for display 12. The printable area 14 is optional and is not required in any embodiment. Further, the tags can be substantially flat or can have a more three dimensional configuration as desired. The tags can be attached to the consumer goods or can, in some embodiments, be built into labeling associated with the goods.

In one embodiment, the attachment mechanism 16 is configured to attach the price tag 10 to the consumer goods in a manner in which is cannot be easily removed without a special tool. This allows the price tag to provide a level of security and act as an anti-theft device. This also prevents a consumer from switching price tags to obtain the goods at a lower price. Such an attachment mechanism can be similar to those used in known anti-theft devices.

The electronic price tag 10 of the present invention can dynamically display information to a consumer and is not limited as are the static displays provided by conventional price tags. For example, the electronic display 12 can display a current price of the goods. When the price changes, the price displayed by the display can be altered appropriately to reflect the new price. The display can comprise a dot matrix and used to display alpha numeric symbols, graphical data or images.

The alteration of display data is preferably through a remote technique, such as using radio frequency (RF) to communicate with circuitry in the tag 10. Further, the display 12 can provide a graphical display, or a display which changes, for example by scrolling. Further, the display can provide information dynamically such as current sales or specials which are being offers, other goods which may be appropriate with the purchase of the goods to which the price tag 10 is attached or graphical display design to attract the attention of a consumer.

The display 12 can display text, graphics, or computer readable objects such as bar codes or by encoding information by flashing or otherwise altering display elements. The display can be of a dot matrix or other type and can comprise, for example, a liquid crystal display (LCD). The optional printable area 14 carries static information which may include text, graphics, or computer readable data such as bar coding or the like.

FIGS. 1 and 2 also show an optional user input 24 which is illustrated as a push button. The user input 24 can be actuated by a consumer as desired. For example, in response to actuation of the user input 24, the display 12 can be turned on to awaken from a power saving mode, or can be used to display alternative information such as advertisements, prices, shopping suggestions, specials, or other data. In another example, user input 24 can be used to enter a programming mode, diagnostic mode, or the like in which user input 24 is used to gain access by authorized personnel to special functions within circuitry or programming carried in tag 10.

Figure 3:
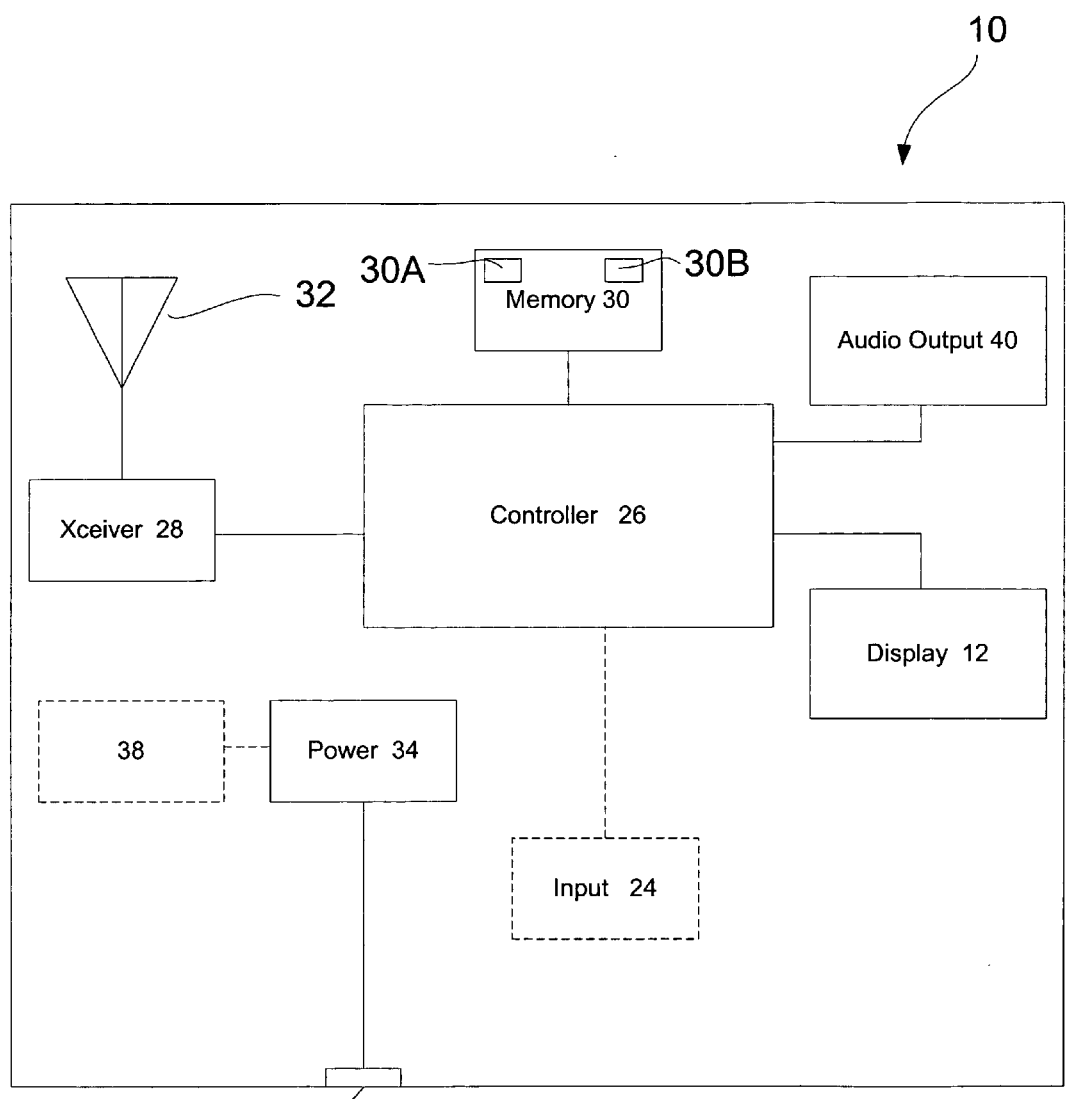
FIG. 3 is a simplified block diagram showing components of an electronic price tag.

FIG. 3 is a simplified block diagram showing electrical components of electronic price tag 10. Electronic price tag 10 includes a controller 26 which couples to a transceiver 28 and a memory 30. In one embodiment, transceiver 28 comprises a receiver only which is only configured to receive data and not configured to transmit data. In still another embodiment, transceiver 28 comprises a transmitter which is not configured to transmit data.

Controller 26 also couples to display 12 and the optional user input device 24. In one example embodiment, the input device 24 is directly associated with display 12 to provide a touch sensitive display. In such an embodiment, the particular function can be displayed which relates to receiving a user input, for example, in a particular area or region of the display. The function can be updated dynamically during use of the electronic price tag 10, for example, in response to receipt of transmissions.

Transceiver 28 couples to an antenna 32. A power source 34 is provided which is used to power electronic circuitry in price tag 10. Power source can comprise for example, a small battery, capacitor, or other device which is capable of storing power for a period of time. Power source 34 includes a charger connection 36. In some embodiments, a solar power source 38 couples to power supply 34 and can be used to recharge power supply 34.

Antenna 32 can be any type of device for receiving electromagnetic transmissions. For example, antenna 32 can be configured to receive transmissions in the range designated for "FM" broadcasts. For example, in the United States these transmissions are generally between 85 MHz and 108 MHz. However, antenna 32 can also be an inductive coupling type antenna as used with RFID tag type technology. Another example coupling technique uses capacitive or inductive coupling.

Transceiver 28 is configured to receive transmissions through antenna 32. These transmissions are typically in a digital format. The transmission can be encoded using any appropriate data transmission technique. Preferable techniques are those which have error reduction or are less susceptible to errors in transmissions. In some environments, the tag 10 may be exposed to various noise sources and the transmission technique should be robust enough to ignore noise from such sources. In one embodiment, transceiver receiver is a receiver and is configured to only receive data. However, in other configurations, transceiver 28 is a transceiver configured for bi-directional communication.

Controller 26 receives data from transceiver 28. Controller 26 can be any type of controller such as a microprocessor or the like. Controller 26 preferably requires very little power to operate such that tag 10 can function for extended periods without receiving additional power. Controller 26 can comprise a customized digital integrated circuit such as an ASIC. However, in some applications, commercially available controllers can be employed.

Memory 30 can be configured to carry program instructions used for operation of controller 26. In some embodiments, these program instructions can be dynamically updated based upon data received through transceiver 28. The memory 30 can carry a more advanced operation environment such as an operating system for advanced functionality and adaptability. One such operating system is Windows CE.

Memory 30 also includes a stored address location 30A and a display data location 30B. Address location 30A contains an address which identifies price tag 10. The address can uniquely identify price tag 10 or can be the same as other addresses in a group of, price tags such as those associated with a particular clothing item.

The memory 30 can be permanent memory such as RAM or EPROM, EEPROM or the like. Additionally, memory 30 can comprise volatile memory such as RAM, or a combination of volatile memory and non-volatile memory. The memory should be of appropriate size for the desired content. For example, a 256-byte memory is sufficient to store information which identifies a particular consumer good. This data can be associated with the address location 30A. The display data location 30B can be 128 bytes, for example.

The display data 30B is used by controller 26 to format data to be displayed on display 12. This can comprise text data, graphics or their combinations. Memory 30 can also contain information such as the date of manufacture of price tag 10, the number of times price tag 10 has been reused, SKU or UPC information or other data which describes particular goods. Store identification information, data related to theft prevention, or other information can also be stored in memory 30. In some embodiments, some or all of this data may be provided on display 12 when a consumer actuates input 24. For example, by pressing input 24, information related to specifications or uses of the particular goods, or instructions related to care for the goods, or other information can be displayed on display 12 by controller 26. In another example, some data may only be accessible when a particular code is entered through input 24.

In one aspect, the displayed data 30B in memory 30 of tag 10 is in accordance with a mark-up language such as HTML, XML or the like. This provides a display environment which is well defined and available across many different types of computer platforms. Various graphical symbols, for example fonts, can also be carried in memory 30 for use in display 12. If sufficient processing power is provided, the display 12 can be used to display animations.

Power supply 34 can be any appropriate power source. For example, a long life rechargeable battery. An optional charger connection 36 is provided to power supply 34. The power supply 34 can be periodically recharged. For example, upon purchase of the goods, the price tag can be removed and the power supply recharged prior to placing the tag back into use. In another example, an optional photoelectric cell 38 is used to charge power supply 34 whenever the price tag 10 is exposed to sufficient light. The ambient light of a retail location may be sufficient to recharge power supply 34. In another example, power supply 34 can be recharged using energy received through antenna 32. This can be, for example, through inductive or other means of coupling to antenna 32. An output can be provided, for example, a signal transmitted to a remote server, which indicates that the power supply 34 needs replacement or recharging.

In one embodiment, the photoelectric cell 38 can act as a light sensor such that display 12 is only activated when the price tag is illuminated. This configuration can assist in saving power when the retail location is not open and there is no reason for the display 12 to be activated.

When transceiver 28 receives a transmission, controller 26 can interpret the digital data contained in the transmission. If the transmission is addressed to the particular price tag 10, determined by comparing data in the transmission with the address stored in the address location 30A, the controller can update data stored in memory 30 as desired. For example, the display data contained in display data location 30B can be dynamically updated to alter the images or text displayed on display 12.

FIG. 3 also shows an optional audio output 40. Audio output can be used, for example, to provide an audible alarm if the price tag 10 is used as an anti-theft device. For example, if the price tag 10 passes beyond a particular point in a retail location, for example near the exit of the location, an audible alarm can be issued through audio output 40. The alarm can be used to identify a shoplifter of the goods. In one example, the audio output 40 can be used to provide the consumer with information, either periodically in an automated format or upon actuation of input 24. This can be particularly useful to assist consumers with impaired vision.

In one embodiment, transceiver 28 is configured to receive digital transmissions carried on sub-bands of normal commercial broadcast, such as broadcasts on the FM radio band. Similarly, digital data can be transmitted using low power transmitters which are only sufficient to cover a desired range, for example such that the transmission does not extend beyond the boundaries of the particular retail location. If the transmission is of sufficiently low power or otherwise directional, the transmission can be limited to a particular region of a retail location or even a shelf or display rack.

Figure 4:
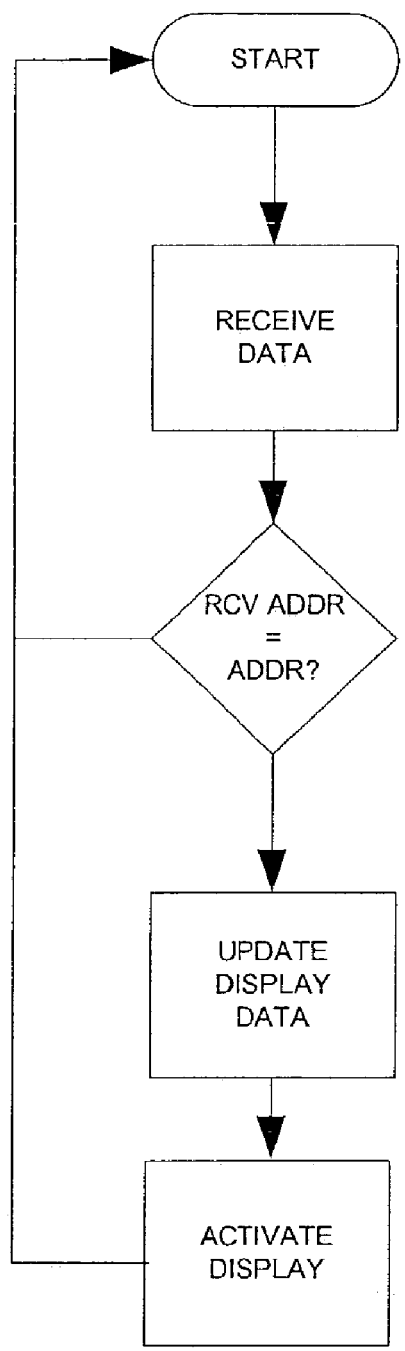
FIG. 4 is a block diagram showing steps associated with the electronic price tag receiving data.

FIG. 4 is a simplified block diagram showing steps performed by digital circuitry, for example controller 26, in electronic price tag 10. Initially, a transmission is received using antenna 32 and transceiver 28. Controller 26 then compares data in a received address field in the received transmission with the address stored in address location 30A. If the comparison is false, the system waits for receipt of further transmissions. If the comparison is true, the display data stored in display data location 30B, the display 12 is then activated by controller 26 to cause the stored data to be displayed. In one embodiment, the display 12 is remotely actuated by receiving the particular code in a received transmission.

Figure 5:
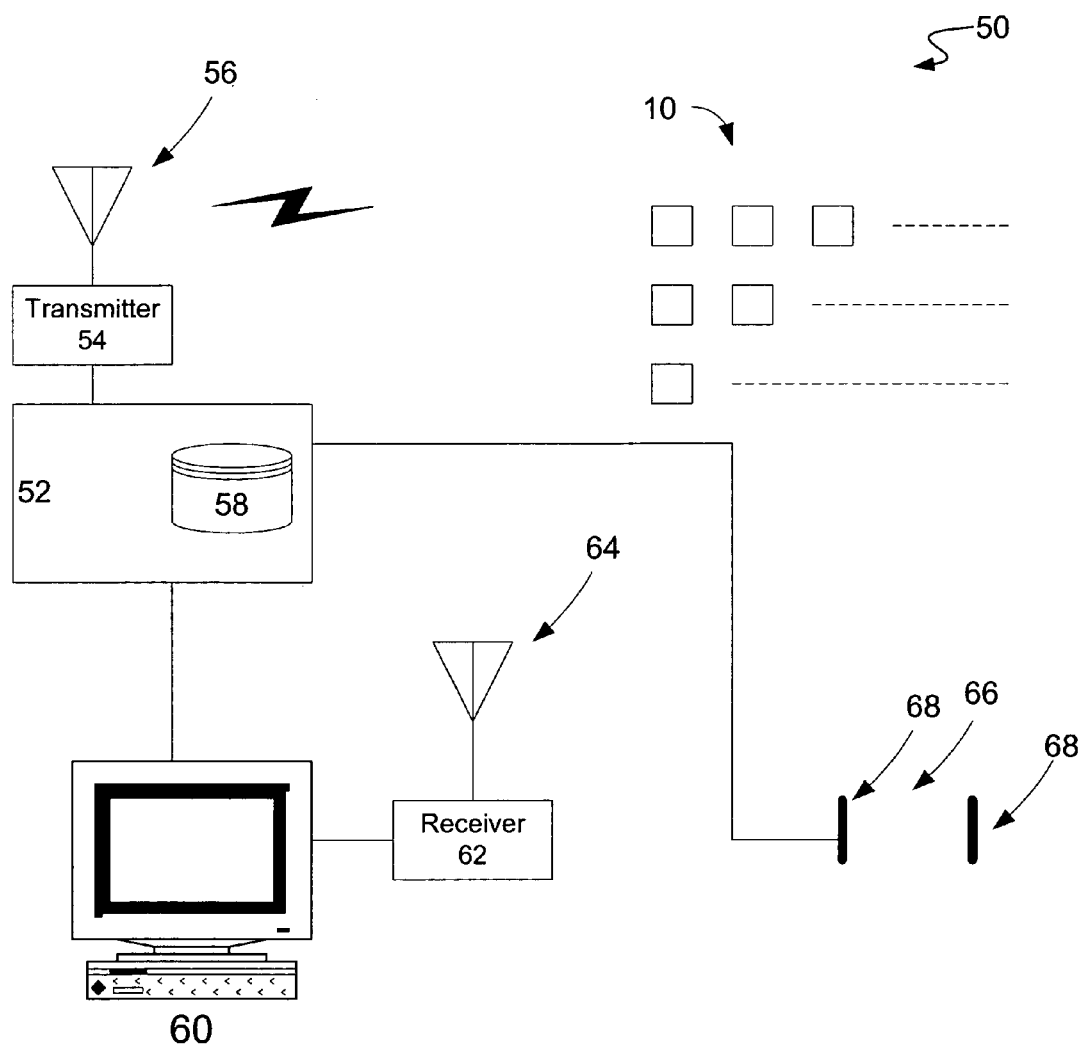
FIG. 5 is a block diagram which illustrates a retail location which includes a plurality of electronic price tags.

FIG. 5 is a schematic diagram which illustrates a retail location 50. A retail location 50 is shown as containing a plurality of electronic price tags 10. A retail server system 52 is configured to communicate data to electronic price tags 10 through transmitter 54 and antenna 56. The particular transmission techniques can be those discussed above. Server 52 includes a server database 58 and is coupled to a point of sale device 60 which can comprise a checkout register, for example. The database 58 can contain display data and address data for transmission to price tag 10. For example, the display data can include the price of a particular item associated with the address.

The database 58 of server 52 can be configured to maintain inventory related information based upon data received through checkout register 60, for example. Additionally, if electronic price tags 10 are configured for two-way data communications, the price tags within the retail location 50 can be periodically scanned and used to update the inventory information in database 58. Additionally, database 58 can contain pricing information. When the pricing information stored in database 58 is updated, the updated price can be transmitted to the appropriate electronic price tags 10 using transmitter 54 and antenna 56. The updated price can then be provided on the displays 12 of the appropriate electronic price tags 10. Further, as server 52 is also coupled to the checkout register 60, when a particular item is brought to a checkout counter by a consumer, the appropriate price will be entered. This arrangement will ensure that the price displayed on the consumer goods is the same as the actual price charged to the consumer during checkout because the pricing information is received from a single source, date of the database 58.

In some embodiments, checkout register 60 is equipped with a receiver 62 coupled to an antenna 64. In such a configuration, the checkout register 60 can read data from tags 10 if the tags 10 are configured for bi-directional data communication. This can be used to identify the goods to the checkout register 60 without requiring an operator to enter the data. In one embodiment, antenna 64 comprises an optical sensor. In such a configuration, data can be communicated using the display 12 on a tag 10 to the checkout register 60. The data can be communicated using barcodes, for example, or other techniques. For example, the display, or pixels within the display, can be modulated in a manner to transmit information. Such a configuration reduces the circuitry required in tag 10 because additional RF transmit circuitry is not required. In embodiments in which the tags 10 transmit data to register 60, the checkout process can be faster and more accurate. For example, if a consumer is checking out with numerous goods, all of the tags 10 may be read in a single pass through a cart.

FIG. 5 also shows an exit 66 from retail location 50. Exit 66 is illustrated as being bordered by receivers 68. The receiver 68 can be used to receive RF transmissions or the like from electronic price tags 10. For example, if RFID tags are employed, the receivers 68 can be configured to receive data from the tags 10. If a tag 10 passes through exit 66, a signal can be provided to server 52, or other device, to initiate an alarm condition. In one example embodiment, the electronic price tags are removed during the checkout process. In another embodiment, the electronic price tags 10 are deactivated, or anti-theft aspects of the device are deactivated, by sending a signal to a tag 10 during the checkout process. For example, a deactivation signal can be sent using antenna 64. In such an embodiment, element 62 in FIG. 5 includes a transmitter. In another example, database 58 is updated such that when the tag 10 passes through exit 66, an alarm is not initiated. If the tags remain on the goods following checkout, the tags can transmit data back to server 52 as the consumer goods exit the retail location through exit 66. This can provide an additional cross check to ensure that the inventory information contained in database 58 is accurate.

As discussed above, the particular communication technique between the electronic price tag 10 and external devices can be chosen as desired. One preferred communication technique employs frequency modulated (FM) transmissions. The transmissions can be on a sub-carrier of a primary transmission. Typical FM receivers are not capable of decoding the sub-carrier signal and therefore the radio provides no audio output in response to the sub-carrier signal. However, if the transceiver circuitry 28 is configured to receive the sub-carrier, this can be used as a data channel to receive, and in some embodiments, transmit data encoded in this technique. The sub-carrier can be encoded using signal phase or other techniques. In some embodiments, the transceiver 28 includes digital signal processing circuitry, an analog-to-digital converter, memory, or other such components. The particular signal modulation format can be, for example, frequency shift keys (FSK) modulation. Data can be received or transmitted in the form of data packets which carry headers. The headers carry information such as address and/or a synchronization pattern in order to synchronize transmissions. An error correction code (ECC) can be used such that errors which occur during reception can be identified and corrected. For example, a Hamming code with a number of parity bits can be used for error correction. Error recognition techniques can also be employed in which an error is identified even if it is not possible to recover the lost data. In some embodiments, frequency hopping techniques are used such that the transmissions are spread out over a number of different frequencies. Additionally, single frequencies or frequency ranges can be identified in which there is only limited noise interference. Further, certain frequencies can be associated with certain transmitters such that a particular signal from a selected transmitter can be identified and received. Embodiments in which the electronic price tag 10 is configured to operate at multiple frequencies, it may be desirable to allow tuning of antenna 32 to improve the sensitivity or "Q" of the antenna. For example, a veractor or other tuning technique can be used to adjust the frequency characteristics of antenna 32. In addition to operating on a sub-carrier or sub-band of a primary FM transmission, transmissions can also be in accordance with direct FM modulation. For example, the signals can be in accordance with FCC Part 15 communications. If receiver 28 includes digital signal processing (DSP) circuitry, much of the encoding, decoding, frequency control, error correction, synchronization, and other functions related to signal transmission and/or receipt can be performed by the DSP.

One commonly used addressing technique which can be employed with the present invention is the TCP protocol, for example, the TCP/IP protocol can be used for addressing information and transmitting the information between electronic price tags and remote servers. This protocol is well suited for use over different types of transmission media including hard wired and wireless media. In such an embodiment memory location 30A can contain an IP address.

Figure 6:
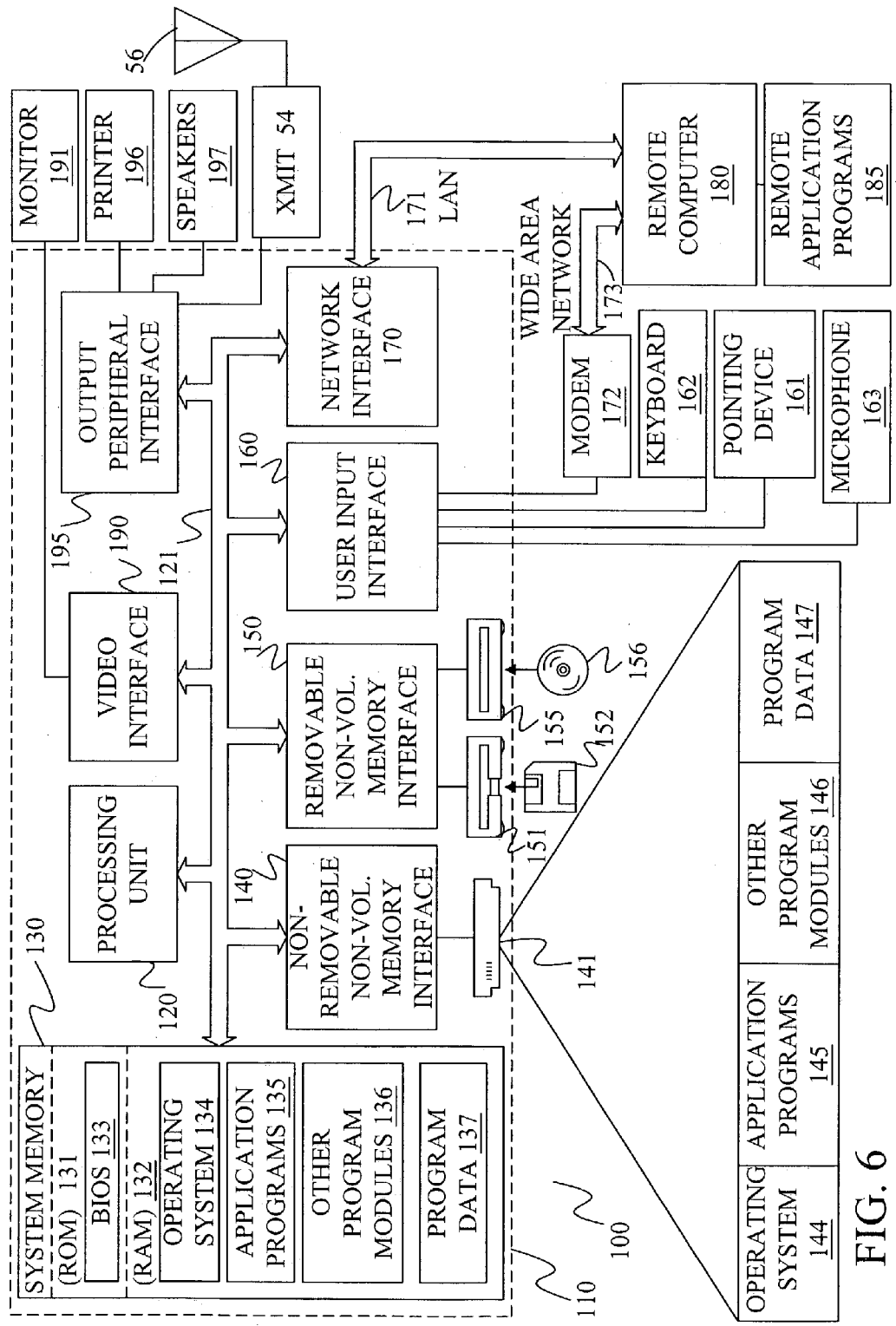
FIG. 6 is a block diagram of a computing system environment for use with the present invention.

The server 52 and/or checkout register 60 can be implemented using any appropriate computer or digital processing system, including distributed systems. For example, FIG. 6 illustrates an example of a suitable computing system environment 100 on which server 52 may be implemented. Aspects of computing system environment 100 can also be implemented in register 60. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, network PCs, minicomputers, mainframe computers, distributed computing environments that include any of the above systems or devices, and the like.

The computing system environment 100 can implement computer-executable instructions, such as program modules. Generally, program modules include routines, programs, objects, components, data structures, etc. that perform particular tasks or implement particular abstract data types. The system can be designed to be practiced in distributed computing environments where tasks are performed by remote processing devices that are linked through a communications network. In a distributed computing environment, program modules are located in both local and remote computer storage media including memory storage devices.

With reference to FIG. 6, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. As discussed above, communication with tags 10 is preferably through a wireless connection.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

The computer 110 may also include other removable/non-removable volatile/nonvolatile computer storage media. By way of example only, FIG. 6 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 6, provide storage of computer readable instructions, data structures, program modules and other data for the computer 110. In FIG. 6, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 6 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 6 illustrates remote application programs 185 as residing on remote computer 180. It will be appreciated that the network connections shown are exemplary and other means of establishing a communications link between the computers may be used.

The computer environment 100 shown in FIG. 6 can be implemented at a retail location, or at a commercial headquarters or other central location. Additionally, the computing environment 100 can be distributed between multiple locations. The computer environment 100 along with the electronic price tag 10 allow the implementation of a highly automated retail environment. The price tags can contain a serial number data or the like, for example, "auto ID" designations can be used to identify specific goods. During transmission, data may be formatted in an encrypted format. Further, such encryption techniques can be used to prevent the unauthorized alteration of data in memory 30. The tag 10 can also be used to provide electronic coupons in which various price discounts are provided based upon a desired input. For example, in one embodiment if a tag 10 is configured to sense proximity to a tag relative to another item or relative to a particular area of a retail location, a discount can be offered to a customer if additional goods are purchased in combination with the specific item or items already selected. The particular wireless communication technique can be selected as desired and includes ultrasonic, inductive, capacitive, RF, or the like. Specific examples of RF communication include AM or FM transmissions, transmissions according with known standards such as the "blue tooth" standard, wireless networking standards, etc. Any appropriate encoding technique, error correction technique or error recognition technique can be employed.

Figure 7:
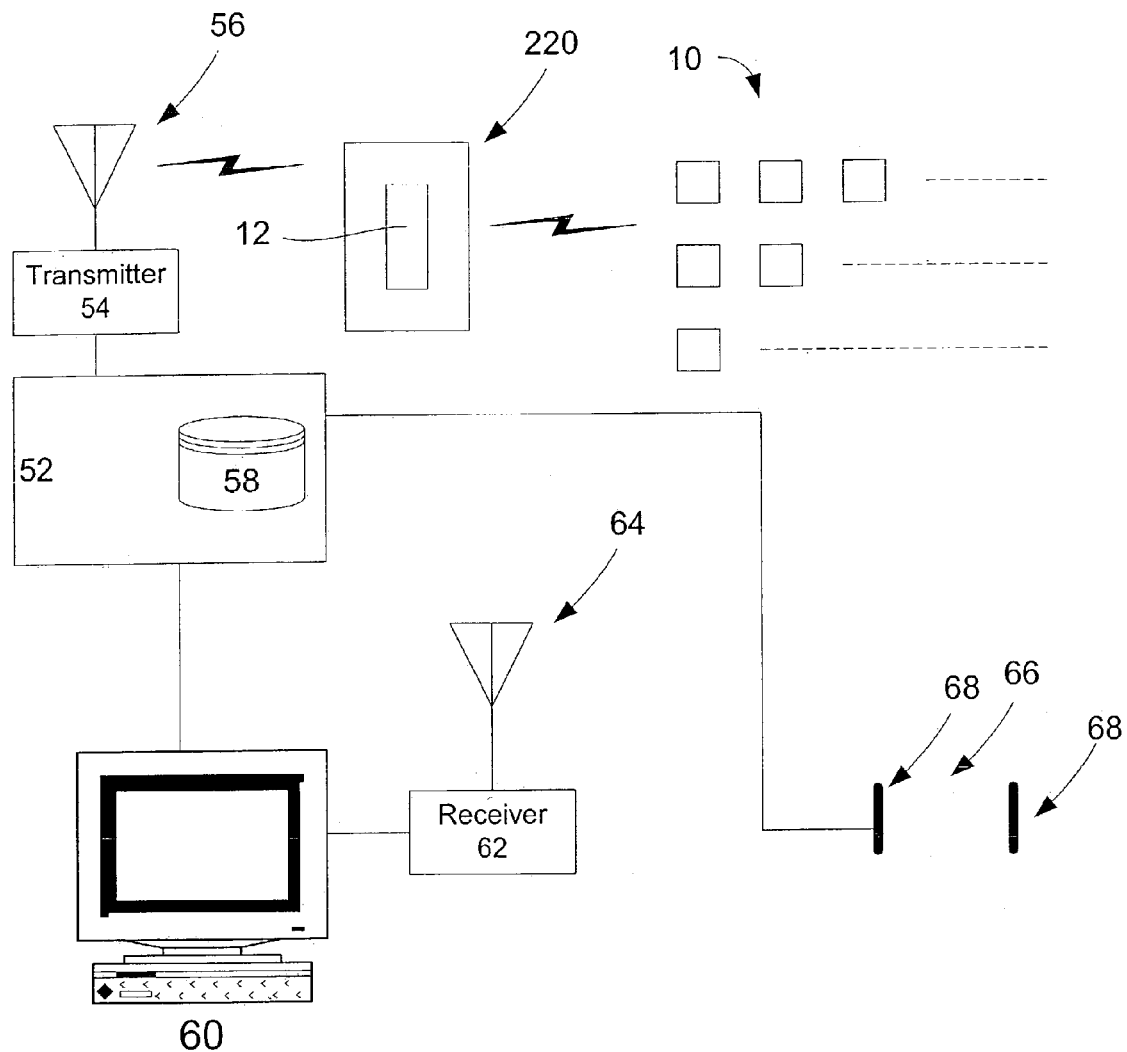
FIG. 7 is a block diagram similar to FIG. 5 which shows an electronic shelf label.

Referring now to FIG. 7, an electronic shelf label 220 is shown in communication with retail server system 52. The electronic shelf label 220 can provide a bridge between retail server system 52 and electronic price tag (wireless data tag) 10. In FIG. 7, elements which are similar to elements set forth in previous figures have retained their numbering. With the present invention, an electronic shelf label 220 can be employed and used to interrogate electronic price tags 10 which are in the proximity of electronic shelf label 220. Note that the electronic price tags 10 shown in FIG. 7 can be similar to those discussed above. In one embodiment, the electronic price labels 10 shown in FIG. 7 do not include a display. Further, the above discussion regarding components and functionality of electronic price label 10 is applicable to the electronic shelf label 220.

The electronic shelf label 220 is configured for positioning on a shelf or other retail location support structure at a retail location. Electronic shelf label 220 includes a display 12 which can be used to display information, for example price, regarding the consumer goods associated with tags 10. The display 12 can be used to display any type of information which is used in a retail location. For example, the display 12 can display advertisements or specials, additional details regarding the consumer goods for example nutritional content, care instructions or the like, other items which are typically associated with the particular consumer goods and which may be of interest to the purchaser, other information including news, weather, time, graphical animations configured to attract attention, etc. Further, the electronic shelf label 220 is able to interrogate the wireless data tags 10 which are within a particular area, for example, in the vicinity of shelf label 220. As discussed below, this allows shelf label 220 to perform computations and programming instructions based on the results of the interrogation. Further, this data can be transmitted to the retail server system 52 to thereby provide a link between service system 52 and the wireless data tags 10.

Figure 8:
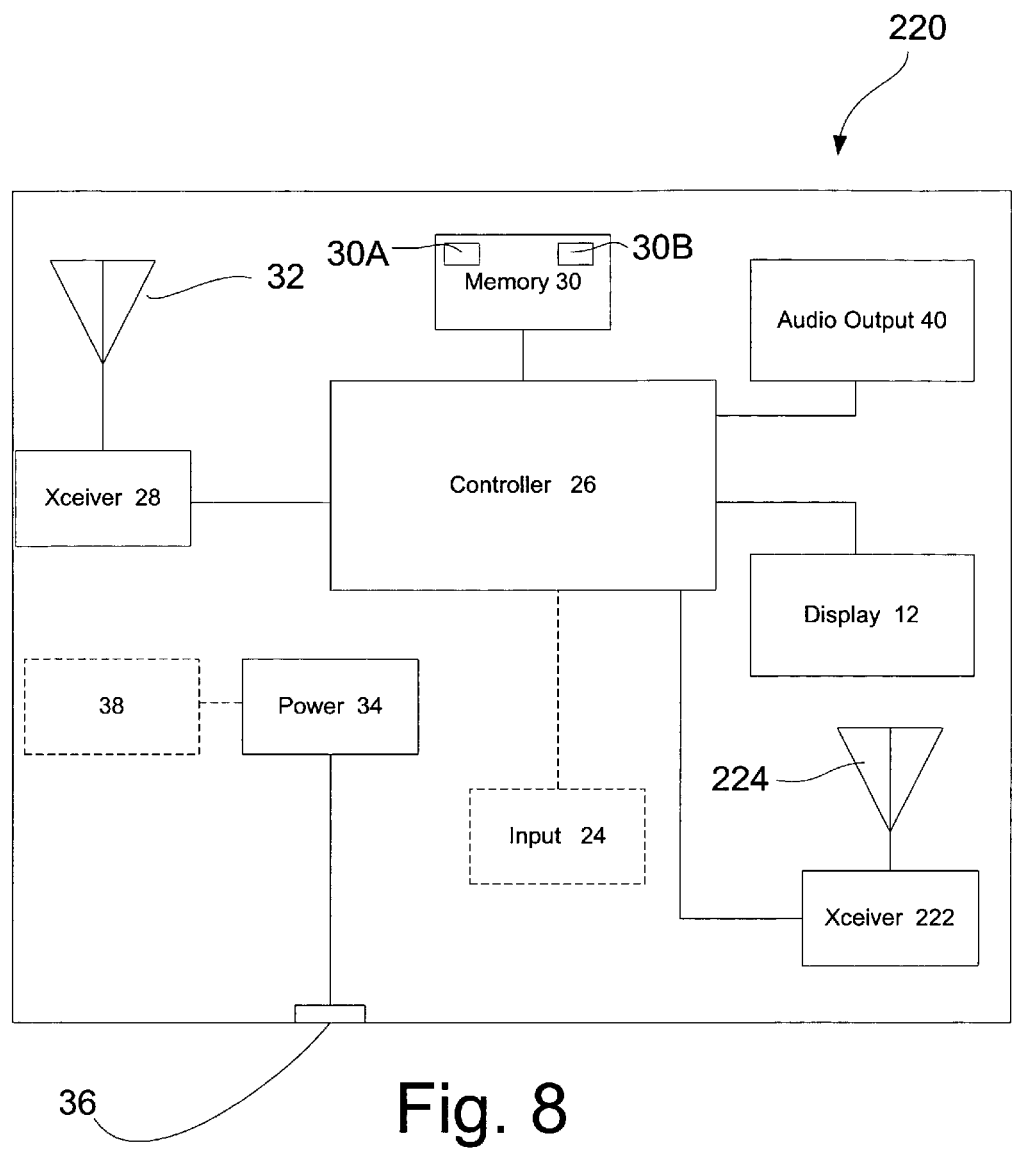
FIG. 8 is a block diagram similar to FIG. 3 which illustrates components of an electronic shelf label.

FIG. 8 shows an example block diagram of electronic shelf label 220. The configuration of electronic shelf 220 shown in FIG. 8 is similar to that of the configuration of electronic data tag 10 shown in FIG. 3 and similar elements have retained their numbering. In FIG. 8, electronic shelf label 220 is illustrated as having two transceivers, transceiver 28 coupled to antenna 32 and transceiver 222 coupled to antenna 224. This configuration is for illustrative purposes only and the shelf label 220 can be implemented with any number of transceivers. If a single transceiver is employed, it can be multiplexed and used to send and/or receive data from/to retail server system 52 and wireless data tag 10. In the configuration of FIG. 8, transceiver 28 is used, to communicate with transmitter 54 of server system 52. Transceiver 222 couples to controller 26 and antenna 224 and is configured for communication with wireless data tags 10.

In electronic shelf label 220 the power source (supply) 34 is optional. For example, connection 36 can be used to hardwire the electronic shelf label 220 to a separate power source. In another example, power source 34 is used as a back up power supply to provide power to circuitry within wireless data tag 220 during power outages or periods of disconnection from a hardwired power supply. Further, a solar power source such as photocell 38 may be used as a backup power source. However, in some embodiments the circuitry within electronic shelf label 220 may require substantially more power than that which can be provided through such a device.

Input 24 can be employed in some embodiments to allow a consumer or store personnel to actuate the controller 26 of the electronic shelf label 220 to display alternative information on display 12. For example, the input 24 can be used to cause display 12 to display advertisements, information related to specials or discounted items, nutritional information, cost per unit information etc. Input 24 can also be used to cause controller 26 in electronic shelf label 220 to send a signal or other data to retail server 52 if desired. For example, this can be used to summon assistance. The input 24 can be any type of input and can be configured to receive complicated user inputs such as through a keypad or the like.

Audio output 40 can be employed to provide audible information such as alarms, messages or the like as desired. The audio output can be configured to operate automatically, in response to a remote transmission, or in response to a user input through input 24.

The transmissions between transceiver 28 of electronic shelf label 220 and transmitter 54 coupled to retail server system 52 can be in accordance with any appropriate technique or protocol. In one embodiment, transmissions are employed on the FM frequency spectrum as discussed above. The data can be digitally modulated onto a sub-band of an FM transmission or, for local transmissions, a direct FM transmission can be used in accordance with the appropriate government regulatory standards. However, any appropriate transmission technique can be employed. Transmissions between electronic shelf label 220 and retail server system 52 typically employs some type of addressing technique. For example, the address stored in address location 30A can be used to address transmissions to electronic shelf label 220. Similarly, transmissions from electronic shelf label 220 can carry the address stored in address location 30A such that the source of the transmission can be identified.

As discussed in connection with electronic price label 10, the display location 30B in memory 30 is configured to carry the data which is to be displayed on display 12. However, in addition to receiving the display data from retail server system 52, or having the display data otherwise stored in memory location 30B, the display data can also be generated based upon data received from wireless data tags 10 by controller 26. For example, if the electronic shelf label 220 interrogates the shelf it is associated with, and controller 26 determines that a certain number of consumer goods remain on the shelf based upon the number of electronic data tags that respond to the interrogation, the controller 26 can cause display 12 to display information based upon the shelf inventory. In one example, a consumer or store personnel can be alerted that only a certain number of items remain. In another example, employees at the retail location can be informed that an item has been improperly placed on the shelf associated with electronic shelf label 220. This can occur, for example, if a customer removes an item from a cart and places it in the wrong location.

Figure 9:
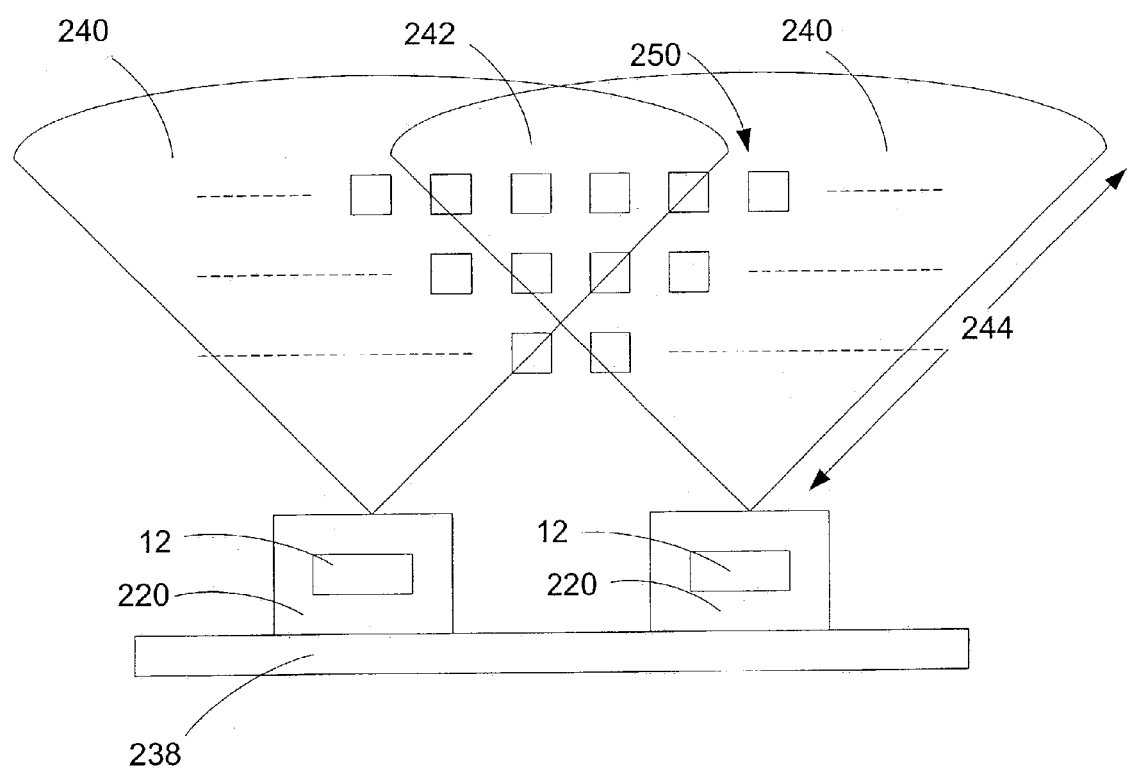
FIG. 9 shows positioning of an electronic shelf labels adjacent consumer goods on a retail product support structure.

FIG. 9 is a diagram which shows an arrangement of two electronic shelf labels 220 positioned adjacent each other. The shelf labels 220 are coupled to a shelf 238 which can be any appropriate retail location support structure. In the embodiment illustrated in FIG. 9, the antennas 224 (See FIG. 8) of electronic shelf labels 220 are configured to have directional patterns 240. The directional patterns 240 can be configured as desired and formed using any appropriate technique. In the configuration of FIG. 9, the directional patterns 240 form an overlap region 242. The patterns 240 are directed toward consumer goods 250, for example on the shelf 238, which carry wireless data tags 10. The directional patterns 240 are illustrated as having a range 244. The range 244 can be controlled, for example, by controlling the strength of transmission between units, controlling the sensitivity of receiver circuitry within units, or using other techniques.

In operation, electronic shelf label 220 is configured to interrogate wireless data tags 10 which are within the antenna directional pattern 240. Preferably, a communication technique is employed which avoids collision between transmissions from the wireless data tags 10 or which is otherwise capable of differentiating between individual transmissions. For example, the tags 10 can transmit on different frequencies or after random time delays. RFID tag communication techniques can be used which allow for such interrogation. In some embodiments, the tags 10 receive power using transmissions from electronic shelf labels 220. For example, the antenna 224 shown in FIG. 8 can provide power, in addition to communication, to the wireless data tags 10. Antenna 10 can be any type of device used for wireless transmission such as an RF antenna, an inductor configured for inductive coupling, a capacitor plate configured for capacitive coupling, etc. The power signal can provide an interrogation signal to the wireless data tag 10. Based upon the interrogation, the electronic shelf label 220 can identify specific serial numbers or other identification inditia such as SKU codes, UPC codes or the like of those tags 10 which are within directional patterns 240. The interrogation signal can originate from a source other than electronic shelf label 220.

In one example, an electronic shelf label 220 determines the number (inventory) of consumer goods 250 (as identified by the electronic data tags 10 which are attached to each item) which are within the directional pattern 240. Shelf label 220 can similarly identify consumer goods 250 which have been misplaced, for example placed on the incorrect shelf, the age of items or expiration date of items which are on a particular shelf, etc. In such an embodiment, the memory 30 of shelf label 220 can contain information related to the content of the shelf. Retail server system 52 can also perform similar functions based upon data received from shelf labels 220 or directly from electronic data tags 10. In some embodiments, the electronic shelf label 220 displays pricing or other information based upon the result of the interrogation. For example, if electronic wireless data tags 10 identify a particular type of consumer good, the electronic shelf label 220 can display the price or other information of the particular goods on display 12 based upon information stored in memory 30, received from retail server system 52 or received from the tag 10. The communication between electronic shelf label 220 and wireless data tag 10 can be unidirectional or bi-directional. In embodiments in which data is transmitted from electronic shelf label 220 to wireless data tag 10, the data within stored memory 30 of tag 10 can be updated as desired. Further, in some embodiments, electronic price labels 220 communicate between themselves and share information. For example, information related to the contents of a particular shelf, display information, data stored in memory 30, or other information can be communicated between electronic shelf labels 220.

The configuration illustrated in FIG. 9 shows an antenna pattern overlap region 242 in which the directional patterns 240 of adjacent electronic shelf labels 220 overlap. This configuration can be used to identify the specific location of a particular electronic wireless data tag 10. For example, if two adjacent electronic shelf labels 220 are able to interrogate a wireless data tag 10, that data tag 10 must be located in the overlap region 242. Other techniques can also be used to identify a specific location of a wireless data tag 10. For example, signal strength or time delay can be used to identify a distance of a wireless data tag 10 from an electronic shelf label 220. Additionally directional techniques can be used such as the use of multiple antennas, or a directional antenna whose pattern can be mechanically or electronically swept through a region, relative to the electronic shelf label 220. The combination of the distance determination and the directional determination is used to identify a specific location, in two or three dimension of a wireless data tag 10.

In one embodiment, electronic shelf labels 220 can interrogate wireless data tags 10 which are carried in a shopping cart or the like, or carried by a consumer passing near the shelf label 220. Referring to FIG. 9, the consumer goods 250 can be located in a cart. In another example, the support structure 238 can comprise a cart which carries a shelf label 220. Similarly, carts, baskets or other items which are used to carry consumer goods can include a wireless data tag 10 which can be interrogated by electronic shelf label 220. As used herein, "cart" includes any container used to carry consumer goods 250. Further, if a consumer is carrying personalized electronic wireless data tag 10, for example a debit card, identification card or the like, the electronic shelf label 220 can identify a particular consumer. In some embodiments, the retail server system communicates directly with tags 10. This information can be used locally to update the display 12 of an electronic shelf label 220 in response to the interrogation. The display 12 can be used to indicate the relationship between the goods in a consumer's cart and the goods carried on a particular shelf, offer an unadvertised special, transmit messages to a consumer, identify a consumer such as a lost child, etc. When bi-directional communication is used, the shelf label 220 can provide a customer with access to a computer network, for example for messaging, web browsing or the like.

Electronic shelf labels 220 and wireless data tags 10 can be used by retail server system 52, either alone or in combination, to monitor the operation of a retail location. For example, inventory can be monitored, movements of consumers, goods or carts can be tracked throughout a retail location, and other data can be retrieved from or placed in the memories of the wireless data tags 10 and electronic shelf labels 220. Retrieved information can be used to alert service personnel that a shelf or retail location needs restocking, that an item has been placed at the incorrect location and must be relocated, that particular goods have expiration dates which have passed, etc. If such an architecture is employed to monitor the movements of particular goods or consumers throughout a retail location, the data can be used to improve the shopping experience of the consumer. For example, the paths of consumers can be monitored as they progress through a retail location and this information used to simplify store navigation or provide a more efficient retail location layout. Further, thefts can be quickly identified as an item proceeds through the retail location without properly going through the checkout process.

In another aspect, data can be provided to a consumer as the consumer moves through a retail location, for example, offering specials or shopping suggestions. A cart, shopping basket or the like which includes a wireless data tag 10 or shelf label 220 having a display or other output can be used to provide information to the consumer. For example, a consumer can use the input 24 to request information from the retail server system 52 such as the location of an item. Instructions, such as the directions from the consumer's current location to the requested item, can then be provided by a retail server system 52 to the consumer on display 12. Electronic messaging services can also be employed such that a consumer can send and/or receive messages, browse the web, etc., through a wireless data tag 10 or shelf label 220 carried on a cart.

Although the present invention has been described with reference to particular embodiments, workers skilled in the art will recognize that changes may be made in form and detail without departing from the spirit and scope of the invention. The various components and function discussed above can be implemented in wire electronic data (price) tags or in electronic shelf labels.

What is claimed is:

1. An electronic shelf label positioned on a first retail product support structure, comprising:
    a transceiver positioned on the first retail product support structure and configured to communicate with at least one wireless data tag moved by a customer proximate the first retail product support structure, each of the at least one wireless data tag being coupled to a corresponding retail product associated with a different retail product support structure such that the corresponding retail product is also moved by the customer proximate the first retail product support structure, the transceiver further configured to communicate with a retail server system;
    a display configured to display information related to retail products; and
    a controller configured to send data to the retail server system through the transceiver as a function of data received through the transceiver from the at least one wireless data tag, the controller further configured to control the display of information on the display as a function of the retail products moved by the customer proximate the first retail product support structure and corresponding to the at least one wireless data tag.

2. The apparatus of claim 1 wherein the transceiver comprises a first transceiver configured to communicate with the plurality of wireless data tags and a second transceiver configured to communicate with the retail server system.

3. The apparatus of claim 1 including a memory having an address location configured to store an address.

4. The apparatus of claim 1 including a memory having a display data location configured to store display data for output on the display.

5. The apparatus of claim 1 including a printable area configured to display static information.

6. The apparatus of claim 1 wherein the display is configured to dynamically display data.

7. The apparatus of claim 1 wherein the display is configured to display alpha numeric symbols.

8. The apparatus of claim 1 wherein the display is configured to display graphical images.

9. The apparatus of claim 1 including an antenna coupled to the transceiver.

10. The apparatus of claim 9 wherein the antenna is configured to receive a radio frequency (RF) signal.

11. The apparatus of claim 9 wherein the antenna is configured for inductive coupling.

12. The apparatus of claim 9 wherein the antenna is configured for capacitive coupling.

13. The apparatus of claim 1 including a user input coupled to the controller.

14. The apparatus of claim 13 wherein the controller changes the display data provided to the display as a function of the user input.

15. The apparatus of claim 1 wherein the communications are in accordance with a frequency modulated (FM) signal.

16. The apparatus of claim 15 wherein the signal has a frequency of between about 85 MHz and 108 MHz.

17. The apparatus of claim 1 wherein the communications are in accordance with an error correction encoding technique.

18. The apparatus of claim 1 including a memory configured to carry program instructions and the controller operates in accordance with the program instructions.

19. The apparatus of claim 18 wherein the program instructions stored in the memory are dynamically changed in response to a received signal.

20. The apparatus of claim 1 including a battery configured to store power received through an antenna.

21. The apparatus of claim 1 including an audio output coupled to the controller.

22. The apparatus of claim 21 including a user input coupled the controller and wherein the controller actuates the audio output in response to the user input.

23. The apparatus of claim 1 wherein the display is configuration to display data in accordance with a mark-up language.

24. The apparatus of claim 23 wherein the mark-up language comprises HTML.

25. The apparatus of claim 23 wherein the mark-up language comprise XML.

26. The apparatus of claim 1 wherein the display data is indicative of a price of at least one retail product.

27. The apparatus of claim 1 wherein the controller determines an inventory of retail products carried on the retail product support structure.

28. The apparatus of claim 27 wherein the display information is related to the inventory.

29. The apparatus of claim 27 wherein the controller sends data to the retail server system related to the inventory.

30. The apparatus of claim 1 including an antenna coupled to the transceiver configured to generate an antenna pattern relative to the first retail product support structure.

31. The apparatus of claim 1 wherein the antenna pattern is configured to overlap with an adjacent antenna pattern from an adjacent electronic shelf label.

32. The apparatus of claim 1 wherein the transceiver provides power to the wireless data tags.

33. The apparatus of claim 1 wherein the controller is configured to control the display of information on the display such that the information indicates a relationship between the retail products moved by the customer proximate the first retail product support structure and retail products positioned on the first retail product support structure.

34. The apparatus of claim 1 wherein the controller is configured to control the display of information on the display such that the information offers an unadvertised special to the customer.

35. An electronic shelf label, comprising:
- a transceiver configured to communicate with a plurality of wireless data tags associated with a plurality of retail products carried on a retail product support structure, the transceiver further configured to communicate with a retail server system;
- an antenna, coupled to the transceiver, configured to generate an antenna pattern relative to the retail product support structure, wherein the antenna pattern is configured to overlap with an adjacent antenna pattern from an adjacent electronic shelf label;
- a display configured to display information related to the plurality of retail products; and
- a controller configured to send data, related to wireless data tags within a directional pattern, to the retail server system through the transceiver circuitry as a function of data received through the transceiver from at least one of the plurality of wireless data tags, the controller further configured to control the display of information on the display.

36. The apparatus of claim 35, wherein the controller is configured to determine a location of a retail product carried on the retail product support structure based on the antenna pattern.

37. The apparatus of claim 36, wherein the controller is configured to determine the location of the retail product carried on the retail product support structure based upon the wireless data tag associated with the retail product being positioned within the overlap between the antenna pattern and the adjacent antenna pattern.

38. The apparatus of claim 36, wherein the controller is configured to determine the location of misplaced goods based on the antenna pattern.

39. The apparatus of claim 36, wherein the controller is configured to determine the location of expired goods based on the antenna pattern.

40. The apparatus of claim 36, wherein the controller is configured to determine areas which require restocking based on the antenna pattern.

* * * * *